(No Model.)

J. S. LAMAR.
VIBRATING PROPELLER.

No. 398,629. Patented Feb. 26, 1889.

WITNESSES,
Villette Anderson,
Mary Boykin.

INVENTOR.
James S. Lamar
by E. W. Anderson
Attorney.

UNITED STATES PATENT OFFICE.

JAMES S. LAMAR, OF VALDOSTA, GEORGIA.

VIBRATING PROPELLER.

SPECIFICATION forming part of Letters Patent No. 398,629, dated February 26, 1889.

Application filed December 12, 1888. Serial No. 293,352. (No model.)

*To all whom it may concern:*

Be it known that I, JAMES S. LAMAR, a citizen of the United States, and a resident of Valdosta, in the county of Lowndes and State of Georgia, have invented certain new and useful Improvements in Rowing Apparatus; and I do declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1:
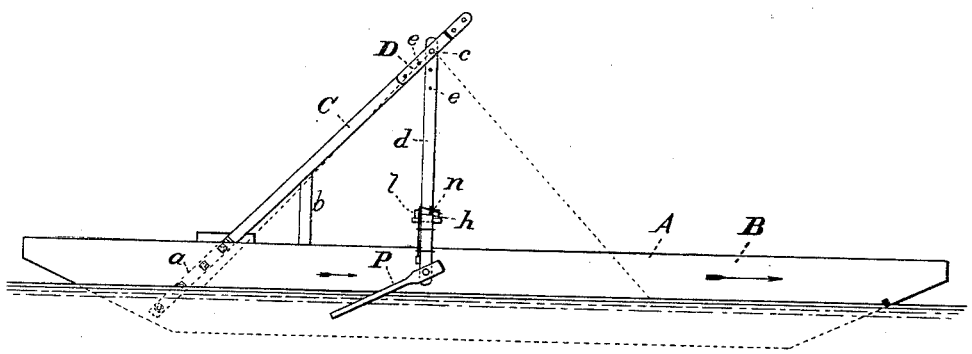
Figure 3:
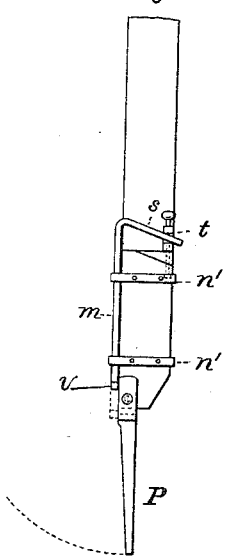
Figure 5:
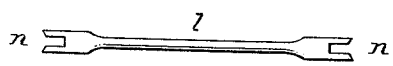
Figure 4:
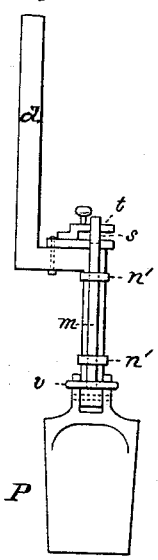
Figure 2:
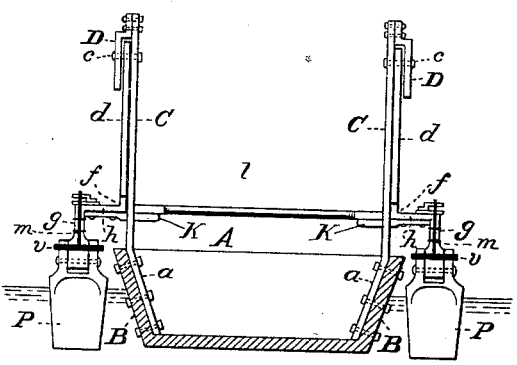

Figure 1 of the drawings is a representation of this invention and is a side view. Fig. 2 is a front view, the boat being shown in section. Fig. 3 is a detail and a side view. Fig. 4 is a detail and a front view. Fig. 5 is a detail and a top view.

This invention has relation to rowing apparatus; and it consists in the construction and novel combination of devices, as hereinafter set forth, and pointed out in the appended claims.

In the accompanying drawings, the letter A designates a boat, and B B the sides thereof. C C are inclined fulcrum-bars, which extend in the vertical planes fore and aft above the gunwale, their lower portions, $a\ a$, being inwardly bent to conform to the shape of the boat, to which they are securely bolted. The height to which these fulcrum-bars rise above the gunwale is usually about three feet, and braces $b$ are applied to make the fulcrum-bars firm. To the upper ends of the fulcrum-bars are bolted the supplementary angle-irons D D, which receive the outer ends of the pivot-bolts $c\ c$, which pass through said fulcrum-bars and through the upper ends of the pendent paddle-shanks $d\ d$ or hangers. The fulcrum-bars and angle-irons may have series of perforations, as indicated at $e\ e$, to permit adjustment of the paddle-shanks, so that the paddles may be made to work light or deep in the water, according to requirement.

The paddle-shanks $d\ d$ are each of angular form, being bent outward at right angles at $f$ and downward at $g$, the horizontal portion, $h$, between $f$ and $g$, serving to carry the lower part of each shank, to which the paddle P is joined, outward clear of the side of the boat. The paddle is preferably of scoop form, and is connected to the shank by a knee-joint or stop-joint, as at $v$, whereby the paddle may easily rise upward in rear, but when pulled in the water is held firmly in line with that portion of the shank to which it is connected.

Each paddle-shank is provided with a short handle, K, extending inward; but for steady rowing the transverse bar handle brace $l$ is preferred. This handle-bar extends across the boat and is provided with bifurcated bearings $n$ at its ends, which are designed to engage the paddle-shank, and at the same time to be readily removable therefrom. By means of this handle-bar both paddles may be operated in unison, and should it be necessary to work either one separately, the handle-bar can be at once disengaged at that end. The handle-bar may rest on projections of the paddle-shanks or on slide-bearings attached to the gunwale of the boat and raised a suitable distance above the same. With the handle-bar both paddles may be operated with one hand. When the boat is long, several of these appliances may be connected thereto in series.

The stop-joint $v$ is preferably a cross-head at the end of a vertical slide, $m$, which is movable in bearings $n'$, and at its upper portion is provided with an inclined arm, $s$, which engages a slot in an adjustable bearing, $t$, connected to the horizontal portion of the paddle-shank. When this bearing is moved in one direction, its engagement with the inclined arm $s$ causes the slide $m$ to rise until the cross-head or stop $v$ is above the pivot connecting the paddle to the end of the shank; but when the bearing $t$ is moved in the opposite direction, the slide and stop are depressed below the pivot and the action of the paddle is reversed.

Having described this invention, what I claim, and desire to secure by Letters Patent, is—

1. The combination, with the fulcrum-supports and angular pendent paddle-shanks, of the paddles and the stop-joints, each consisting of a slide having at its lower end a cross-head engaging with the respective paddle, and which slide moves in bearings upon the paddle-shank, and has at its upper end an inclined arm engaging with an adjustable bearing connected to the horizontal portion of the paddle-shank, substantially as specified.

2. The combination, with the fulcrum-supports and angular pendent paddle-shanks, of the paddles, the stop-joints, each consisting of a slide having at its lower end a cross-head engaging with the respective paddle, and which slide moves in bearings upon the paddle-shank and has at its upper end an inclined arm engaging with an adjustable bearing connected to the horizontal portion of the paddle-shank, and the removable transverse bar, substantially as specified.

3. The combination, with fulcrum-bars attached to the boat, and pendent paddle-shanks, of the bifurcated transverse handle-bar, substantially as specified.

In testimony whereof I affix my signature in presence of two witnesses.

JAMES S. LAMAR.

Witnesses:
M. B. LANE,
E. W. LANE.